United States Patent [19]
Lewis

[11] 3,724,029
[45] Apr. 3, 1973

[54] APPARATUS FOR KILLING POULTRY OR OTHER FOWL

[75] Inventor: Ernest E. Lewis, Flowery Branch, Ga.

[73] Assignee: Gainesville Machine Company, Inc., Gainesville, Ga.

[22] Filed: Dec. 17, 1970

[21] Appl. No.: 99,024

[52] U.S. Cl....................................................17/11
[51] Int. Cl..............................................A22c 21/00
[58] Field of Search....................................17/11, 52

[56] References Cited

UNITED STATES PATENTS 3,477,092  11/1969  Simmons..................................17/11
2,081,229   5/1937  Fisher et al..............................17/11

*Primary Examiner*—Robert W. Michell
*Assistant Examiner*—John F. Pitrelli
*Attorney*—Newton, Hopkins & Ormsby

[57] ABSTRACT

This invention relates to a method and apparatus for killing chicken or other fowl suspended in a head lowermost position by making a cut or similar opening through the skull of the bird to sever the arteries going to the brain and eyes adjacent the base of the brain. More particularly, this invention includes a pair of spaced guide means detailed for guiding and orienting the head of the fowl to be killed along a predetermined path and to a predetermined location. The spaced guide means includes rotary guiding and orienting members which are provided for advancing the neck of the fowl along the predetermined path and for moving the head to the predetermined location. The rotary guide members are provided with fluid lubricating means to permit the neck of the fowl to be moved easily through the guide means. A rotary cutting member is detailed in location relative to the predetermined path and predetermined location to make a cut or similar opening through the skull of the bird for severing the arteries going to the brain and eyes as the bird is advanced along the predetermined path. The rotary cutter means is adjustable relative to the predetermined location whereby the angular position and depth of the cutting operation can be varied.

4 Claims, 5 Drawing Figures

PATENTED APR 3 1973 3,724,029

APPARATUS FOR KILLING POULTRY OR OTHER FOWL

BACKGROUND OF THE INVENTION

In the processing of poultry and other fowl, the bird is usually suspended headdown from a shackle which travels along an overhead conveyor to those locations at which various processing operations are performed. Most of these processing operations are performed automatically by various poultry processing devices. However, the killing of the bird is still most often accomplished by hand because the automatic mechanical killing devices heretofore available have not been completely satisfactory. This is because, in the past, poultry, such as chickens and the like, have normally been killed by cutting the neck skin of the bird and the jugular vein in order that the heart continues to beat and pump the blood from the fowl to permit complete draining of the blood therefrom as it bleeds to death and because it is undesirable to also sever the spinal cord, windpipe or gullet of the bird at the time the jugular vein is severed.

Severing the spinal cord of the bird causes muscular spasms to occur which may result in bruising or breaking the wings or other parts of the bird; and, in addition, the severing of the spinal cord is undesirable because it stops the heartbeat of the bird. The continuing heartbeat obtained for a period of time when only the jugular vein of the bird is severed is highly desirable because it causes blood to be pumped from the bird's body, rather than simply to flow from the body by gravity, which has been found to improve the quality of the meat.

If the windpipe is severed at the time that the jugular vein is severed, the continuing heartbeat of the bird which produces the highly desirable pumping of blood from the body of the bird will also cause continued breathing of the bird and the undesirable drawing of blood into the windpipe and lungs of the bird.

Thus, the killing of poultry as it moves along a processing line has commonly been accomplished by severing the jugular vein without, whenever possible, also severing the spinal cord or the windpipe. The automatic mechanical killing devices heretofore available have been unable to accomplish this processing operation in a completely satisfactory manner since, in many instances, they often cut the neck of the bird too deeply so that the neckbone itself is partially cut and the gullet, spinal cord and windpipe are also cut.

The method is carried out very well manually on low production lines when the processor has a good operator who is able to cut the jugular vein without cutting the windpipe or cutting into the neckbone itself. Most modern processing plants, however, have a very high production rate and, as a result of this production rate, the manual operator is so rushed that he, too, often cuts deeply into the neck of the bird. Besides the aforementioned problems, two additional problems are created when the neck of the bird is cut too deeply. First, since the neck skin has been cut, the neck is usually contaminated when the chicken is passed through the scalding bath, and secondly, it has been found that the head of the chicken may be knocked off during the feather-picking operation which is conducted further down the processing line.

Thus, it is preferable that the killing of poultry as it moves along a processing line be accomplished not only without severing the spinal cord, gullet or windpipe, but even without cutting the neck skin of the bird.

SUMMARY OF THE INVENTION

Accordingly, it is the object of the present invention to provide a new and improved method of killing chickens and other fowl in a completely satisfactory and fully automatic manner as the bird passes along the processing line.

Another object of the present invention is to provide a novel method of killing chickens and other fowl without cutting the neck of the bird, but which still provides for the proper bleeding thereof and prevents the occurrence of muscular spasms.

Yet another object of this invention is to provide an improved apparatus for automatically killing poultry which does not require that the neck of the bird be cut.

Still another object of this invention is to provide an improved apparatus for automatically killing chickens and other fowl which reduces the chances of contamination upon the subsequent removal of the windpipe and gullet.

Another object of this invention is to provide improved apparatus for automatically killing chickens and other fowl wherein the depth and angular position of cutting the blood vessels of the fowl is adjustable relative to the fowl head.

A further object of this invention is to provide improved apparatus for automatically killing chickens and other fowl in which rotatable guide means are provided for positioning the head of the bird relative to a predetermined location as it is advanced along a predetermined path.

A further object of this invention is to provide means for lubricating the neck and head of the fowl during an advancing operation.

An additional object of this invention is to provide improved apparatus for automatically killing chickens and other fowl which is simple in construction, economical to manufacture and reliable in operation.

The above stated objects of the present invention are obtained and disadvantages of the prior art devices are overcome by the present invention which basically includes a pair of transversely spaced fixed guide members having a pair of rotatable advancing members located thereabove and including drive means for rotating the advancing members in opposite direction to effect an advancement of a bird along a predetermined path. A fluid supply means is operatively associated with the rotatable advancing members for introducing a quantity of lubricating liquid onto the advancing members to improve the advancing and orienting operation thereof. Severing means including rotatable cutting means, is located adjacent the path of advancement and is detailed in location to make a cut or similar opening through the skull of the bird for severing the arteries going to the brain and eyes adjacent the base of the brain. The rotatable cutting member is selectively settable to a selected angular position and depth of cut.

These and other objects and advantages of the details of construction will become apparent upon reading the following description of one illustrative embodiment of the invention with reference to the accompanying drawings, wherein like reference numerals have been used to designate like parts throughout the several figures, and wherein:

BRIEF DESCRIPTION OF THE FIGURES OF DRAWING

Figure 2:
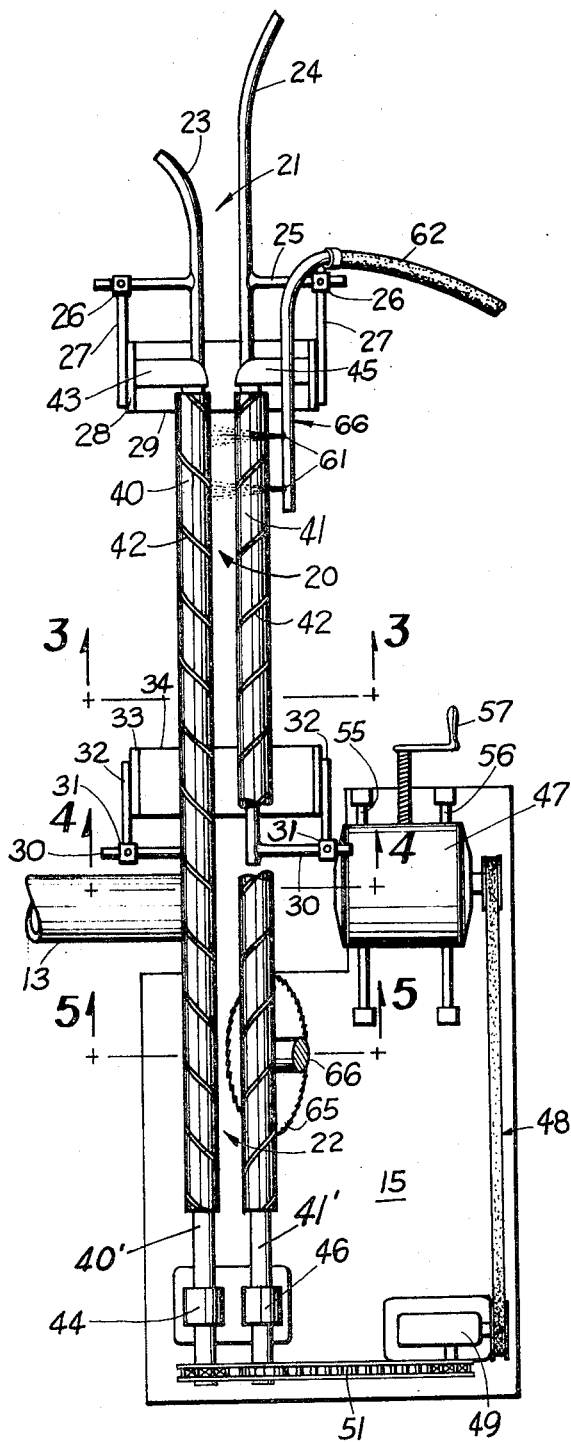
FIG. 2 is an enlarged fragmentary top plan view of the improved poultry killing apparatus, with certain parts being omitted for purpose of clarity.
Figure 3:
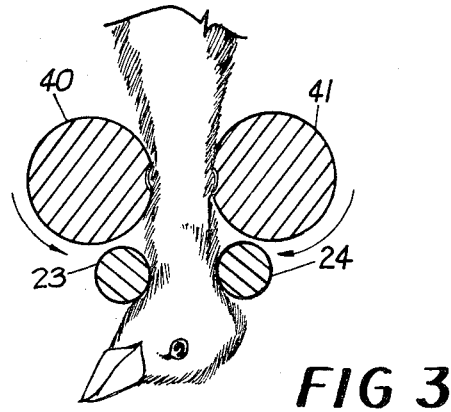
FIG. 3 is a vertical sectional view taken substantially along line 3—3 of FIG. 2 illustrating the position of the head of a bird during an advancing operation.
Figure 4:
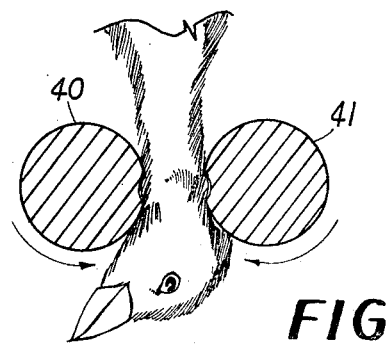
Figure 5:
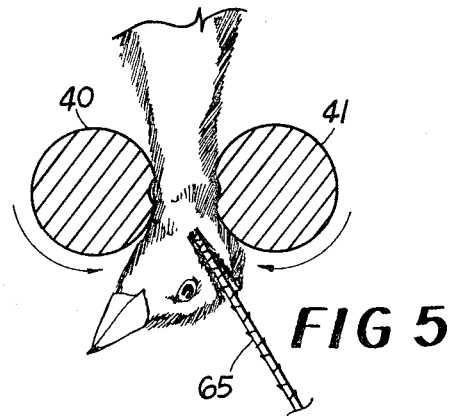

FIG. 4 is a vertical sectional view similar to FIG. 3 taken substantially along line 4—4 of FIG. 2; and FIG. 5 is a vertical sectional view similar to FIGS. 3 and 4 and taken along line 5—5 of FIG. 2.

DESCRIPTION OF THE ILLUSTRATIVE EMBODIMENT

Referring now to the drawing, the improved fowl killing apparatus will be described with reference to a support framework 10, a head advancing and holding means 20 and a rotary cutting member 65.

Figure 1:
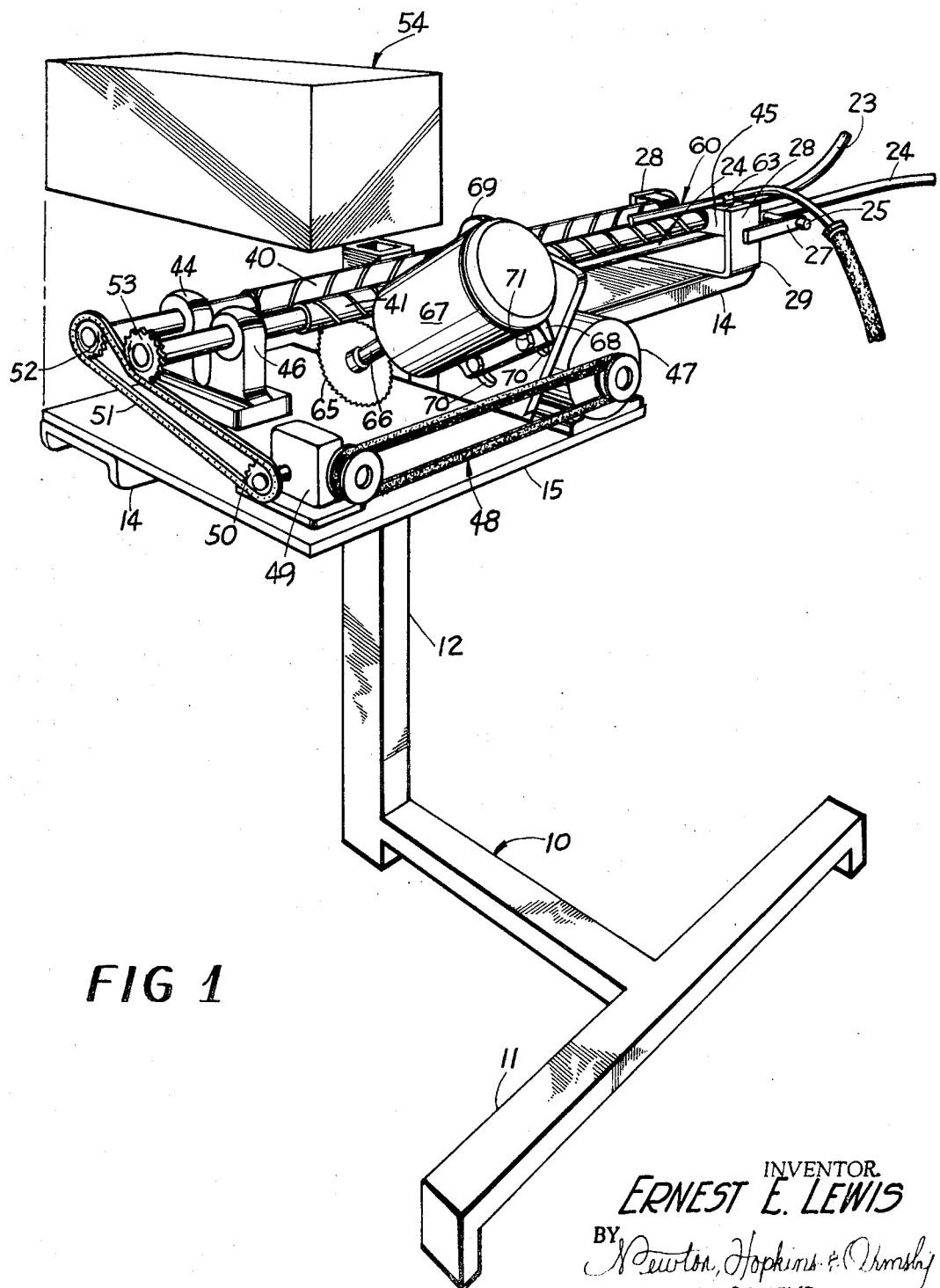
FIG. 1 is an overall perspective view of the improved killing apparatus, with a cover portion exploded therefrom for purposes of clarity.

The function of the support framework is to provide a means for supporting the advancing and holding means 20 and the rotary cutting member 65 in a predetermined location relative to a poultry processing line having a conventional overhead conveyor means for conveying fowl in a head lowermost position past the poultry killing apparatus disclosed herein. As shown in FIGS. 1 and 2, the support framework 10 includes a T-shaped supporting base 11 having a vertical post 12 extending upwardly from one leg of the T-shaped base. A transverse support arm 13 is fixed to an upper extended end of vertical post 12 and has supported thereon a horizontally oriented channel shaped support member 14. A generally rectangular shaped mounting plate 15 is supported on member 14 for providing a support for the advancing and holding means 20 and the rotary cutting member 65. The support framework utilized herein is constructed of conventional metal stock members with the joints connected together by conventional means, such as welding, not shown.

Referring now particularly to FIG. 2, the advancing and holding means 20 is oriented relative to the supporting framework to include an entrance end 21 and an exit end 22. The function of the advancing and holding means is to provide a means for engaging the neck portion of a bird conveyed therealong in a head lowermost position and to advance the neck and head of the bird along a predetermined path past the location of the rotary cutting member 65 for making a cut in the head of the bird adjacent the base of the brain for severing the arteries leading thereto.

The advancing and holding means includes a pair of transversely spaced guide rods 23, 24. Each of the guide rods 23, 24 includes a first stud shaft 25 extending laterally therefrom adjacent the entrance end. Stud shaft 25 is adjustably supported by a collar 26. The adjusting collar 26 includes a conventional locking screw means for allowing the stud shaft to be adjusted laterally relative to the collar 26 for varying the spacing between guide rods 23, 24. Collar 26 is fixed to a link 27 extending outwardly from a leg member 28 of a substantially U-shaped support bracket 29. The U-shaped support bracket 29 is mounted on an extended end of the channel-shaped horizontal support member 14, as shown in FIG. 1.

Each of the guide rods 23, 24 includes a second stud shaft 30 extending laterally outward therefrom adjacent the exit end, with stud shaft 30 adjustably supported by a collar element 31. Collar 31 is similar in design to the adjustable collar 26 and will cooperate therewith to allow the guide rods 23, 24 to be transversely spaced relative to each other. The adjustable support collar 31 is fixed to a link 32 extending from a leg 33 of a U-shaped support bracket 34. The means for supporting guide rod 24 is identical to the support means for guide rod 23 and the corresponding parts thereof have been designated with like reference numerals.

The above described relationship of the pair of guide rods 23, 24 is detailed such that the rods 23, 24 are supported in substantially horizontal relationship with a guide path located therebetween. The dimensions of the guide path can be varied by adjusting the stud support shafts 25, 30 within the adjustable support collars 26, 31 respectively.

As shown in FIGS. 1 and 2, a pair of advancing rollers 40, 41 are supported vertically above the two guide rods 23, 24. Each of the conveying rollers 40, 41 includes helical groove means 42 defined thereon for aiding in the advancement of the neck of the bird past the cutting member 65. The advancing roller 40 is supported adjacent the entrance end by a bearing block 43 which is fixed to upstanding leg 28 of the U-shaped bracket 29. Roller 40 is supported adjacent the exit end by a conventional bearing means 44 mounted on the upper surface of mounting plate 15. Conveying roller 41 is supported in substantially coplanar relationship and horizontally spaced relative to roller 40 by means of a bearing block 45 which is fixed to a second upstanding leg 28 of the U-shaped bracket 29 adjacent the entrance end thereof. Roller 41 is supported adjacent the exit end by means of a conventional bearing means 46 mounted on the upper surface of support plate 15. Rollers 40, 41 are provided with reduced surface portions adjacent the exit end to allow the head of the bird to be freed therefrom after being cut.

As shown in FIGS. 1 and 2, the advancing rollers 40, 41 are driven by means of a conventional electric motor 47. Power from motor 47 is delivered by a conventional belt and pulley means 48 to gear box 49. Drive from gear box 49 is effected through a sprocket 50 and chain 51 to a sprocket 52 which is fixed to a left extended end of roller 40, as shown in FIG. 1. The upper run of chain 51 passes beneath a sprocket 53 which is fixed to the left extended end of conveying roller 41. The above described driving relationship will rotate conveying roller 40 in a counterclockwise direction while the conveying roller 41 is driven in a clockwise direction when viewed from the discharge end. The helical groove means 42 of each of the conveying rollers 40, 41 are detailed in design such that the opposite directions of rotation of rollers 40, 41 will effect an advancement of the neck of the fowl along the path therebetween. The upward direction of motion of rollers 40, 41 adjacent the path of advancement will draw the head of the fowl upward, as shown in FIG. 4, to position it firmly against the rollers to hold the head in predetermined position relative to cutter 65, as shown in FIG. 5, for the cutting operation.

As shown in FIG. 1, a cover or housing 54 is provided for surrounding the gear box 49, chain and sprocket means 50, 51, etc., and support bearings 44, 46.

Drive motor 47 is mounted in a pair of guide track means 55, 56 for movably supporting motor 47 relative to support plate 15. Adjustment of the motor along the guide track means 55, 56 is effected by a conventional adjustable handle 57.

A fluid dispensing nozzle 60 is supported above advancing roller 41 adjacent the entrance end thereof. The fluid dispensing nozzle 60 is provided for dispensing a quantity of lubricating fluid onto the rollers 40, 41 during an advancing operation. Fluid dispensing nozzle 60 includes a plurality of openings 61 in which the fluid conveyed along supply line 62 is dispensed outwardly thereof. The fluid dispensing nozzle 60 is supported in a position above roller means 41 by a bracket 63 which is attached to the upper surface of the bearing block 45. The lubricating fluid dispensed by nozzle 60 could be water or other conventional lubricating material similar thereto.

As shown in FIG. 1 and 5, the improved poultry killing apparatus of the present invention is provided with a rotary cutting member 65 detailed in location to make a cut through the head of the fowl adjacent the base of the brain to sever the jugular veins leading thereto. The rotary cutting member 65 is fixed to shaft 66 extending outwardly from a conventional electric drive motor 67. Motor 67 includes a base 68 mounted on an upstanding plate 69. Plate 69 is secured to the horizontal support plate 15 and includes a plurality of arcuate-shaped slots 70. Motor base 68 is provided with a series of conventional connecting bolts 71 which extend through the arcuate slot 70. Only two of the arcuate slots 70 are shown in FIG. 1, however, it is to be understood that the opposite side of the electric motor 67 would also include a pair of connecting bolts 71 which would extend through similarly designed slots in the upstanding plate 69. The adjustable connection on motor 67 by means of the bolt 71 and arcuate slots 70 will allow the rotary cutting member 65 to be adjusted relative to the path of advancement of rollers 40, 41. The adjustment of the rotary cutting member 65 will allow the depth of the cut made by the rotary cutting member to be varied and will allow the angular position of the cutting member to be adjusted to a desired set position. The rotary cutting member 65 is located below the conveying rollers 40, 41 adjacent the exit end thereof and to the left of the guide rods 23, 24, as shown in FIG. 2.

Conventional electrical control and circuit means not shown is provided for effecting operation of the electric motor 47 and motor 67.

OPERATION

Prior to an initiation of a killing operation, the improved killing apparatus must be placed below and oriented relative to a conveying line which includes a plurality of conventional supporting shackles which support the fowl in a head lowermost position.

To initiate an operation of the improved poultry killing apparatus of the present invention, the rotary cutting member 65 is adjusted to a desired set position relative to the path of advancement of rollers 40, 41 whereby the rotary cutting member 65 will make a cut through the head of the fowl adjacent the base of the brain to sever the jugular veins leading thereto. After the rotary cutting member has been set in the desired set position, a killing operation is begun by energizing the motor 47 which will drive the rotary advancing rollers 40, 41. Energization of the motor 67 is then effected to rotate the rotary cutting member 65. Conventional control means (not shown) is then operated to effect a flow of lubricating fluid through the supply line 62 to be dispensed outwardly onto guide rollers 40, 41 by the dispensing nozzle 60.

In using the above described improved killing apparatus, the fowl being killed normally would have been stunned by some conventional means, such as electrical shock up the conveying line from the killing apparatus. As the stunned fowl are conveyed by the overhead conveying apparatus relative to the guide rods 23, 24 the height of the guide rods 23, 24 are detailed such that the head of the bird will pass into the space therebetween below the surface of the guide rods 23, 24. After the neck of the conveyed fowl enters the entrance end of the rotatable advancing rollers 40, 41 the neck of the fowl will be grasped by rollers 40, 41 in such a manner that the helical grooves will aid in advancing the neck of the fowl toward the exit end of the advancing and holding means and past the cutting means 65. The counterclockwise rotation of conveying roller 40 and clockwise rotation of conveying roller 41 will draw the neck of the fowl upwardly to locate the head of the fowl in a detailed position relative to the rotary cutting member 65 whereby a cut will be made through the head adjacent the base of the brain thereby severing the jugular veins leading to the brain. The cut jugular veins adjacent the base of the brain will allow the bird to bleed freely until all blood is exhausted therefrom.

After the cut has been made, the head of the fowl will be allowed to pass through the reduced portion 40', 41' of the conveying rollers 40, 41 whereby the fowl can be conveyed to the next adjacent location for bleeding.

An important feature of the present invention is that the poultry is killed in such a way as to completely drain a maximum amount of blood therefrom through the head portion of the bird rather than the neck portion which will allow the head to stay intact with the bird during further processing operations.

It now becomes apparent that the above described illustrative embodiment of the improved fowl killing apparatus is capable of obtaining the above stated objects and advantages. It is obvious that those skilled in the art may make modifications in the details of construction without departing from the spirit of the invention which is limited only by the scope of the appended claims.

What is claimed is:

1. In an improved apparatus for killing poultry or other fowl comprising, in combination:

a. means for advancing the head of a bird along a predetermined path, said advancing means including means for moving the head of the bird in an angular direction relative to said predetermined path during said advancing operation for positioning said head at a predetermined location, said advancing means includes a pair of spaced driven roller means, wherein said roller means are provided with surface portions detailed for advancing the neck portion of poultry along said predetermined path and in said angular direction during a killing operation, said roller means includes helically arranged grooved surface portions for effecting said advancing operation; and b. cutting means supported relative to said predetermined path and said predetermined location for making a cut through the skull on the back side of the head for severing the arteries going to the brain and eyes adjacent the base of the brain in response to advancement along said path, wherein the depth of said cut is detailed to allow the head to remain attached to the body and neck portion of the poultry.

2. In an improved apparatus for killing poultry or other fowl as described in claim 1 further characterized in that said apparatus includes dispensing means for dispensing lubricating material on said advancing means for lubricating said advancing means during said advancing operation.

3. In an improved apparatus for killing poultry or other fowl as described in claim 1 further characterized in that said advancing means includes a pair of spaced guide means with one of said guide means located on each side of said predetermined path and wherein said guide means are adjustable relative to each other to increase or decrease the space therebetween.

4. In an improved apparatus for killing poultry or other fowl as described in claim 1 further characterized in that said cutting means includes selectively settable means for adjusting the position of said cutting means relative to said predetermined path and said predetermined location.

* * * * *